(12) United States Patent
Potnis et al.

(10) Patent No.: US 10,795,735 B1
(45) Date of Patent: Oct. 6, 2020

(54) METHOD AND APPARATUS FOR LOAD BALANCING VIRTUAL DATA MOVERS BETWEEN NODES OF A STORAGE CLUSTER

(71) Applicant: EMC IP HOLDING COMPANY LLC, Hopkinton, MA (US)

(72) Inventors: AJay Potnis, Pune (IN); Sindhura Chamala, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 16/176,041

(22) Filed: Oct. 31, 2018

(51) Int. Cl.
*G06F 9/50* (2006.01)

(52) U.S. Cl.
CPC .......... *G06F 9/5088* (2013.01); *G06F 9/5077* (2013.01); *G06F 2209/505* (2013.01)

(58) Field of Classification Search
CPC .. G06F 3/067; G06F 11/2069; G06F 11/2097; G06F 16/182; G06F 3/0631; G06F 3/0647; G06F 9/505
See application file for complete search history.

(56) References Cited

U.S. PATENT DOCUMENTS

| 8,037,345 | B1 * | 10/2011 | Iyer | G06F 11/1004 714/6.12 |
|---|---|---|---|---|
| 9,509,612 | B1 * | 11/2016 | Armorer | H04L 47/12 |
| 9,521,198 | B1 * | 12/2016 | Agarwala | G06F 12/0253 |
| 2009/0248847 | A1 * | 10/2009 | Sutoh | G06F 3/0632 709/223 |
| 2016/0239239 | A1 * | 8/2016 | Tin | G06F 11/00 |
| 2017/0269859 | A1 * | 9/2017 | Xu | G06F 3/0617 |
| 2019/0034237 | A1 * | 1/2019 | Siddappa | G06F 9/5077 |
| 2019/0227845 | A1 * | 7/2019 | Sridhar | G06F 9/5011 |
| 2020/0034194 | A1 * | 1/2020 | Szczepanik | G06F 3/067 |

* cited by examiner

*Primary Examiner* — Dong U Kim
(74) *Attorney, Agent, or Firm* — Anderson Gorecki LLP

(57) ABSTRACT

Data Virtual Data Movers (VDM) are assigned to nodes of the storage cluster and a backup node is assigned for each data VDM. A system VDM on each node collects node statistics including operational parameters of the node and activity levels of the data VDMs on the node. A cluster manager collects the node statistics from each of the system VDMs and uses weighted collected node statistics to assign a node score to each node in the storage cluster. The cluster manager uses the node scores to identify possible data VDM movement combinations within the storage cluster by applying a set of hard rules and a set of soft rules to evaluate the possible data VDM movement combinations. If a VDM movement combination is selected, it is implemented by moving at least some of the data VDMs within the cluster to attempt to equalize node scores within the cluster.

17 Claims, 6 Drawing Sheets

US 10,795,735 B1

METHOD AND APPARATUS FOR LOAD BALANCING VIRTUAL DATA MOVERS BETWEEN NODES OF A STORAGE CLUSTER

BACKGROUND

This disclosure relates to computing systems and related devices and methods, and, more particularly, to a method and apparatus for load balancing virtual data movers between nodes of a storage cluster.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

Data Virtual Data Movers (VDM) are assigned to nodes of the storage cluster and a backup node is assigned for each data VDM. A system VDM on each node collects node statistics including operational parameters of the node and activity levels of the data VDMs on the node. A cluster manager collects the node statistics from each of the system VDMs and uses weighted collected node statistics to assign a node score to each node in the storage cluster. The cluster manager uses the node scores to identify possible data VDM movement combinations within the storage cluster by applying a set of hard rules and a set of soft rules to evaluate the possible data VDM movement combinations. If a VDM movement combination is selected, it is implemented by moving at least some of the data VDMs within the cluster to attempt to equalize node scores within the cluster.

DETAILED DESCRIPTION

Figure 1:
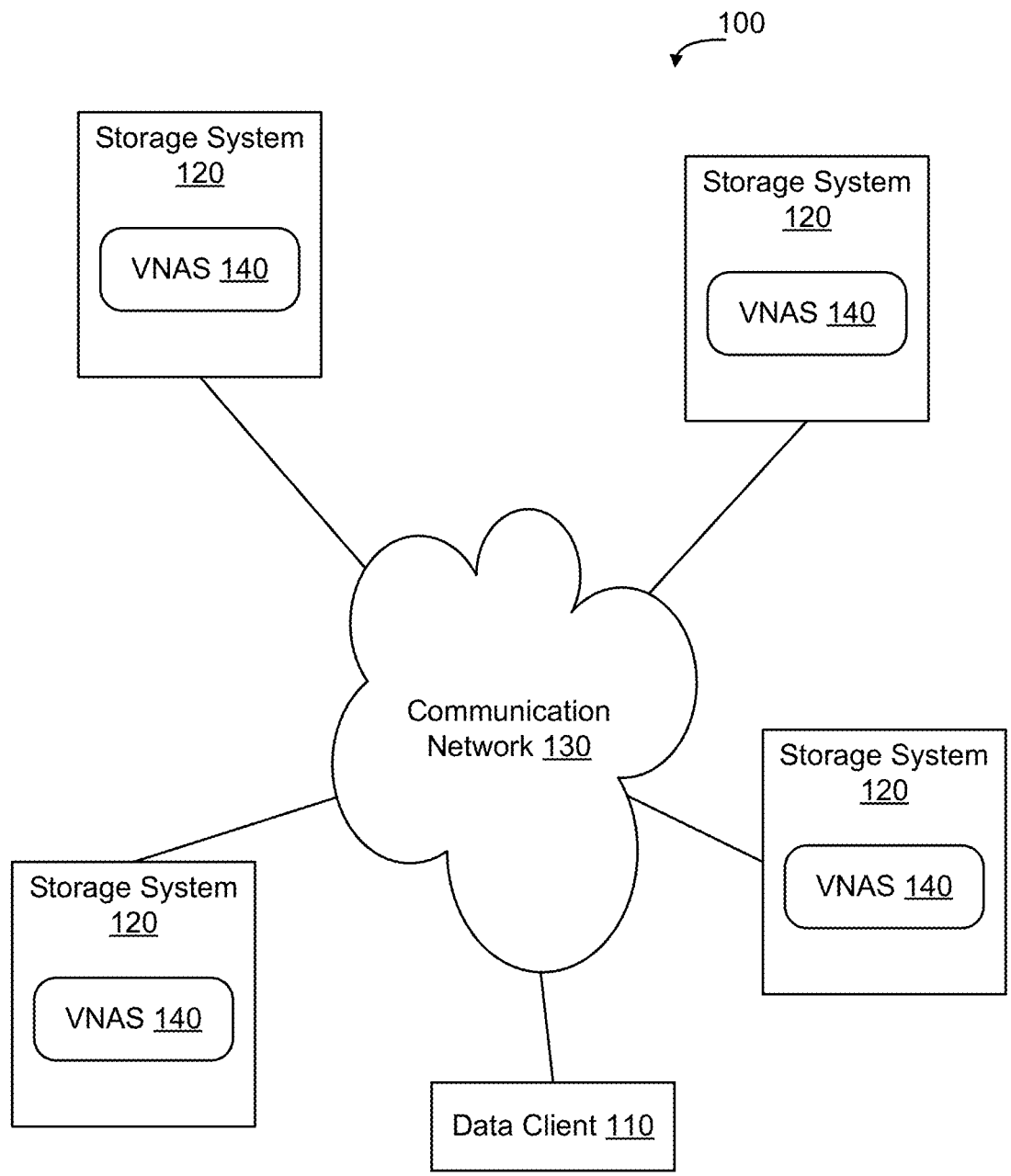
FIG. 1 is a functional block diagram of an example storage environment according to some embodiments of the present disclosure.

FIG. 1 is a functional block diagram of an example storage environment 100. As shown in FIG. 1, in storage environment 100, a data client 110 may access storage resources provided by one or more storage systems 120 over a communication network 130. In some embodiments, the communication network 130 is an Internet Protocol (IP) communication network 130 enabling transmission of IP data packets through the communication network 130, although other forms of communication networks may be used to interconnect the data client 110 with storage systems 120 depending on the implementation.

Data from the data client 110 is stored in the storage resources of the storage systems 120. Storage resources that are accessed by a data client 110 over a communication network 130 are referred to herein as Network Attached Storage (NAS). In some embodiments, the physical storage resources of a storage system 120 are abstracted to the data client 110 by software applications running on the storage systems 120 referred to herein as "Software Defined Network Attached Storage (SDNAS) applications." A given SDNAS application may, in some embodiments, be implemented as a Virtual Network Attached Storage (VNAS) server 140.

To provide enhanced reliability, data from data client 110 may be stored in more than one storage system 120 on the communication network 130. In some embodiments, the data client 110 interacts with a file system maintained by a primary VNAS server 140 on a primary storage system 120. If a failure occurs on the primary storage system 120, on communication network 130, or elsewhere, which renders the data client 110 unable to access the file system on the primary storage system 120, the data client 110 is able to access the file system on the backup VNAS server 140 on the backup storage system 120.

Two or more virtual NAS servers 140 that are logically associated to provide redundant access to one or more file systems will be referred to herein as a "cluster". In some embodiments, a cluster may include multiple VNAS servers 140, and each VNAS server 140 may be responsible for hundreds of file systems. A virtual NAS server 140 will also be referred to herein as a "node" 300 in the storage cluster 330. In some embodiments one node 300 assumes responsibility for cluster management to specify which node in the cluster has primary responsibility for each file system, and which node(s) in the cluster are backup nodes for each respective file system. As used herein, the term "data Virtual Data Mover (VDM)" will be used to refer to software that is responsible for managing access to and replication of one or more file systems on a VNAS server 140. A given node in a storage cluster 330 may have multiple SDNAS processes executing thereon, and each SDNAS process may have multiple data VDMs executing within it. The term "system Virtual Data Mover (VDM)" will be used to refer to software that is responsible for managing overall organization of the storage cluster 330.

Figure 2:
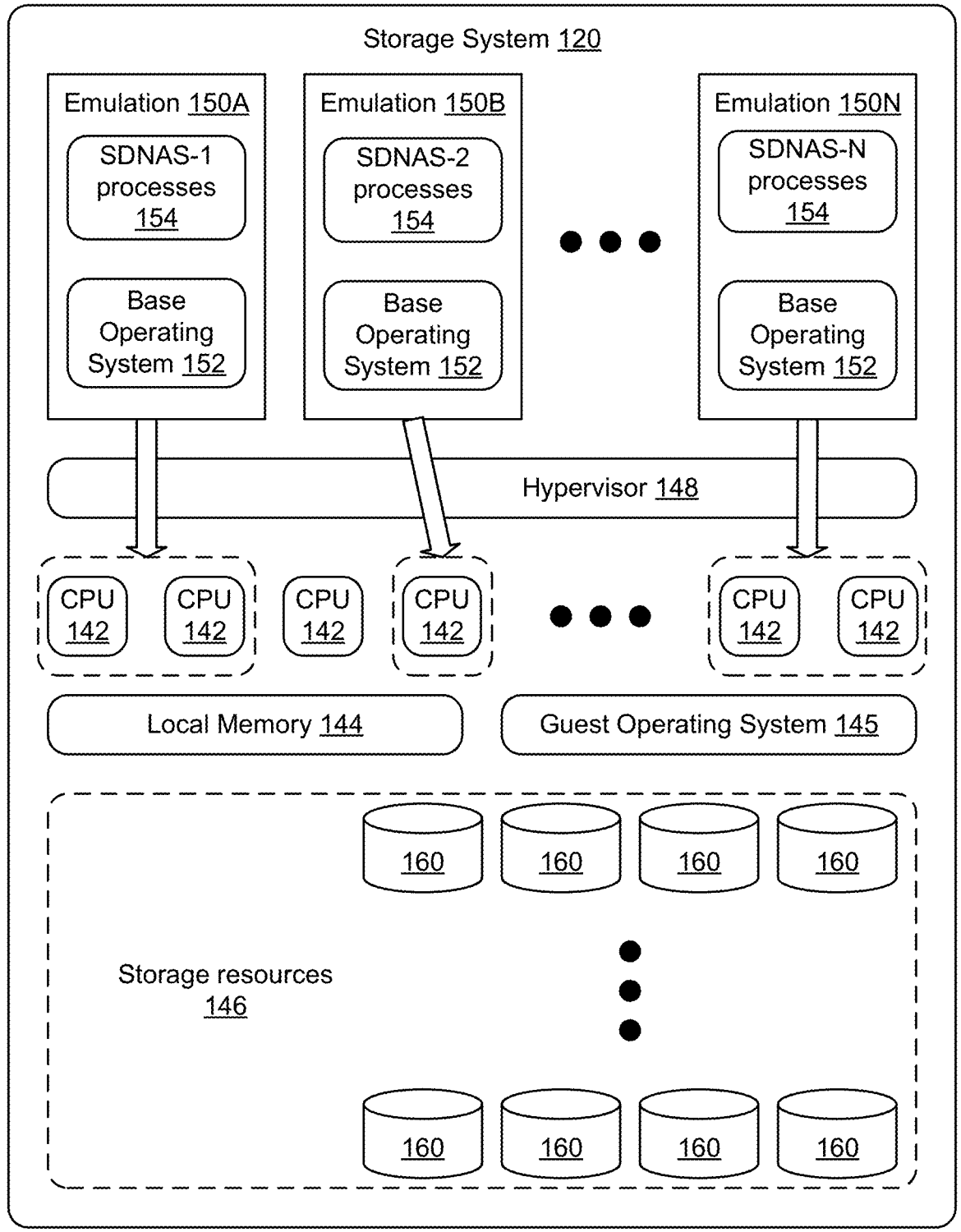
FIG. 2 is a functional block diagram of a storage system for use in the storage environment of FIG. 1 according to some embodiments of the present disclosure.

FIG. 2 is a functional block diagram of an example storage system 120 for use in a storage environment 100. As shown in FIG. 2, the storage system 120 has physical resources including a number of CPU processor cores 142, local memory 144, guest operating system 145, storage resources 146, and other physical resources. A hypervisor 148 abstracts the physical resources of the storage system 120 from emulations 150, and allocates physical resources of storage system 120 for use by the emulations 150. In some embodiments, a given storage system 120 may have storage resources 146 that are implemented using an array of discs 160, which may be implemented using a number of different storage technologies.

Each emulation 150 has a base operating system 152 and one or more application processes running in the context of the operating system. As shown in FIG. 2, in some embodiments, one or more of the emulations 150 instantiated on storage system 120 has a Software Defined Network Attached Storage (SDNAS) process 154 instantiated thereon to enable the emulation 150 to implement a Virtual Network Attached Storage (VNAS) server 140 on the communication network 130. In some embodiments, emulations 150 implementing network attached storage processes operate as nodes 300 in storage cluster 330.

As used herein, the term "Virtual Data Mover" (VDM) will be used to refer to one or more software applications configured to execute in an emulation 150 to enable the emulation 150 to implement a VNAS server 140 on the communication network 130. In the example shown in FIG. 1, emulations 150A-150N include VDM applications 162 and, as such, are configured to implement VNAS servers 140 on the communication network 130. As discussed below, each emulation 150 including an SDNAS process may support one or more VDMs and participate in managing data within a storage cluster 330. A given storage system 120 may have emulations 150 functioning as nodes 300 in multiple storage clusters 330. In some embodiments, the VDM applications are implemented in software and abstract the underlying data storage provided by the storage system 120.

To provide enhanced reliability, data from data clients 110 may be replicated between storage nodes 300. In this context, a given storage system 120 may be considered a storage node 300. Likewise, a director board 302 within a storage system 120 may be considered a storage node 300, such that each storage system 120 implements multiple storage nodes 300 in the storage environment 100. A group of storage nodes 300 that are logically defined to cooperatively provide storage level redundancy will be referred to herein as a storage cluster 330.

Figure 3:
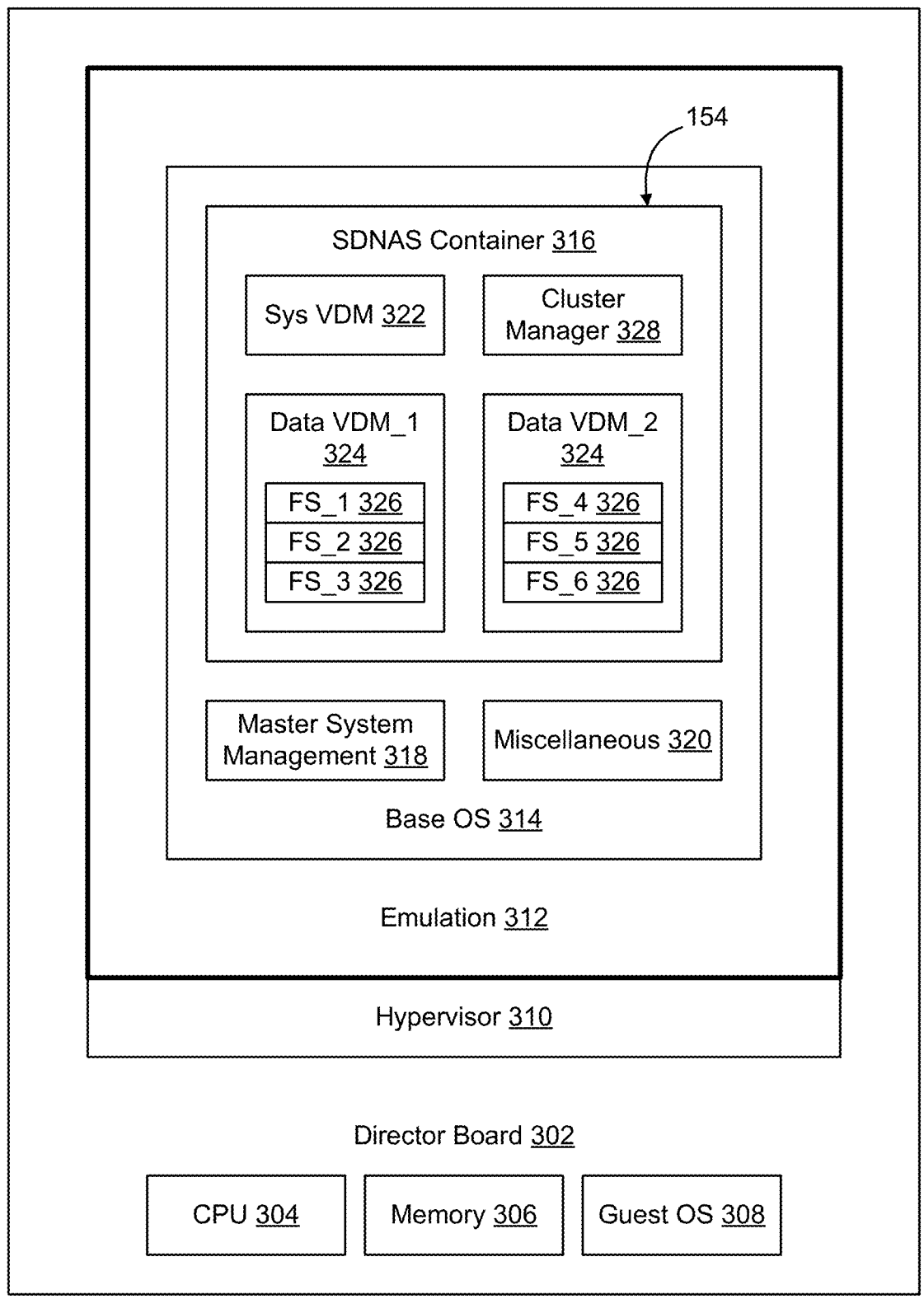
FIG. 3 is a functional block diagram of an emulation implementing a Software Defined Networked Attached Storage (SDNAS) process including a set of virtual data movers on an example node of a storage cluster, according to some embodiments of the present disclosure.

FIG. 3 is a functional block diagram of an example node 300 of a storage cluster 330. As shown in FIG. 3, in some embodiments node 300 is formed as a director board 302 having one or more CPUs 304, memory 306, and on which a guest operating system 308 is instantiated. A hypervisor 310 abstracts the physical resources of the director board 302 from emulations 312 to enable multiple emulations 312 to execute on a given director board 302. In some embodiments, multiple emulations 312 on a given director board 302 are not allocated to the same storage cluster 330, to provide physical redundancy within the storage cluster 330. Each emulation 312 has its own base operating system 314 in which a SDNAS container 316 executes. A master system management process 318 and various other miscellaneous processes 320 are also instantiated to execute in the context of the base operating system 314 within emulation 312.

In some embodiments, the SDNAS container 316 includes a system Virtual Data Mover (VDM) 322 that coordinates execution of the SDNAS processes 154 implemented by SDNAS container 316 with other SDNAS processes 154 being executed in other SDNAS containers 316. Each node 300 also executes one or more Data VDMs 324 responsible for handling user file systems. Each data VDM 324 is executed on a node 300 that is part of a storage cluster 330. Each data VDM 324 manages one or more file systems 326. Data for the file systems 326 is maintained in primary node storage resources 146. For redundancy, data of the file systems is also replicated to a backup node and maintained in backup node storage resources. During failover, the VDM is closed on the primary node and brought up on the backup node (optionally with the same VDM ID) to enable continued access to the file systems being managed by the VDM.

One of the SDNAS processes in a cluster of SDNAS processes executes a cluster manager 328 that controls the overall structure of the storage cluster 330, such as defining which nodes 300 are included in the storage cluster 330, which nodes and which SDNAS processes 154 executing on those nodes are to host particular data VDMs 324, which nodes should be backup nodes for particular data VDMs 324, and which user file systems 236 should be handled by each data VDM 324.

Figure 4:
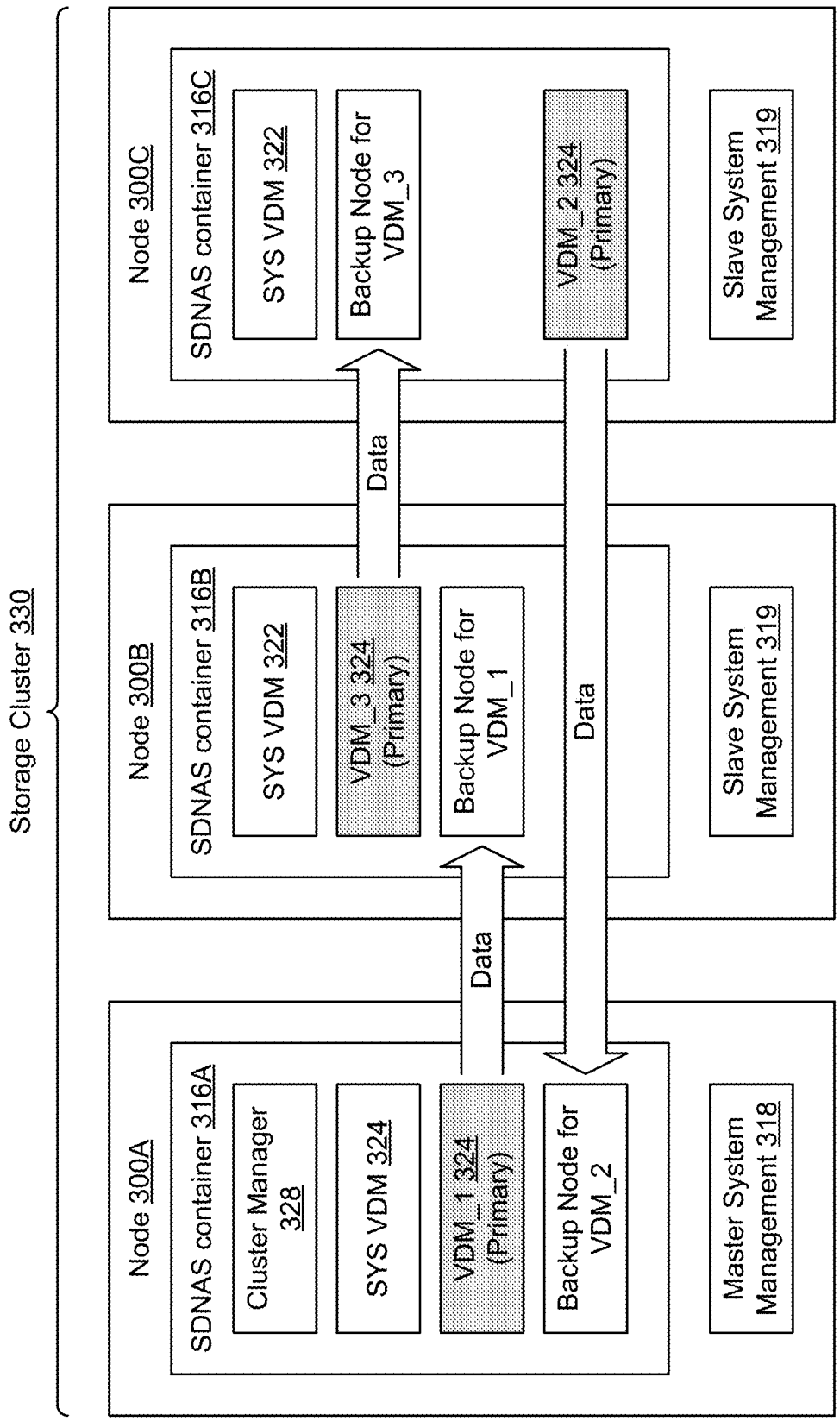
FIG. 4 is a functional block diagram of a set of nodes implementing an example storage cluster according to some embodiments of the present disclosure.

FIG. 4 shows an example storage cluster 330 including a plurality of nodes 300. As shown in FIG. 4, each node 300 includes at least one SDNAS container 316, within which data VDMs 324 execute. One of the nodes 300 in the storage cluster 330 (node 300A in FIG. 4) is the master node and executes the cluster manager 328 in its SDNAS container 316. The master node further executes master system management process 318. Each of the other nodes 300B, 300C, in the storage cluster 330 run a slave system management process 319. The management processes 318, 319 collect statistics on their respective node 300 and are used to perform overall management of the storage cluster 330.

In some embodiments, each VDM 324 in a cluster 330 is assigned a backup node 300 at the time of creation of the VDM 324. This backup node 300 is responsible for failing over the VDM 324 when the VDM 324 or the node on which the VDM 324 is executing becomes unavailable. For example, in FIG. 4 VDM_1 324 on node 300A has node 300B assigned as its backup node. Data VDM_2 on node 300C has node 300A assigned as its backup node. Data VDM_3 on node 300B has node 300C assigned as its backup node. In FIG. 4, the box that is shaded is the location of execution of the VDM, and the box that is not shaded is designated as the backup node for the VDM. As is clear, a given SDNAS container may host VDMs within the storage cluster 330. Where the SDNAS container is executing on a node that has been designated as the backup node for one or more other VDMs in the cluster, the SDNAS container likewise may be required at a later point in time to assume responsibility for one or more of those other VDMs in the event of a failover.

The cluster manager 328, in some embodiments, is responsible for determining which node 300 in the storage cluster 330 is provisioned to host the VDM 324 and which node 300 in the storage cluster 330 is the backup node for the VDM 324. In some embodiments, a given cluster will have at most one SDNAS container 316 executing on a given node. Hence, if a node is a backup node for a VDM 324 in the cluster, upon failover of the VDM the SDNAS container executing on the given node will implement the VDM process to enable continued access to the file systems being maintained by the VDM.

In some embodiments, the cluster manager 328 collects usage statistics from the system management processes 318, 319, and uses the statistics to determine the optimum layout of the VDMs 324 and their backup nodes 300 in the storage cluster 330. The cluster manager 328 then triggers VDM 324 movement within the storage cluster 330 to achieve improved overall performance by the storage environment 100.

Load balancing of VDMs between nodes of a storage cluster 330 and attendant VDM 324 movement may be triggered manually, for example, from a user interface. Load balancing may also occur automatically, for example periodically within each storage cluster. Load balancing of VDMs between nodes of a storage cluster 330 may also occur automatically upon the occurrence of particular events. One example event that may cause load balancing of VDMs between nodes of a storage cluster 330 to occur may be a determination that performance of one or more of the file systems supported by the storage cluster has failed to achieve an intended service level objective. Another example event that may cause load balancing of VDMs between nodes of a storage cluster 330 is occurrence of an event affecting the topography of the storage cluster, such as a failure of a node of the storage cluster or a recovery of a node of the storage cluster.

In some embodiments, the system management processes 318, 319 gathers statistics based in 10, CPU usage, and memory usage information of multiple monitored aspects of the storage environment 100. Example statistics may be collected from the storage systems 120, director boards 302, nodes 300, SDNAS containers 316, and from the data VDMs 324. Statistics may be collected natively by processes running on emulation 150, from the various operating systems including storage system 120 guest operating system 145, emulation host operating systems 152, and from other aspects of the storage systems 120 having nodes 300 participating in the storage cluster 330.

The cluster manager 328 gathers the complete statistics from all nodes 300 and the current layout of data VDMs 324 within the storage cluster 330. Each node 300 in the storage cluster 330 is then assigned a score based on its statistics and the weighted statistics relative to other nodes 300 in the storage cluster 330. The cluster manager reassigns data VDMs 324 between nodes 300 of the storage cluster 330 to balance workload between the nodes 300 such that all nodes 300 in the storage cluster 330 have similar workload scores, subject to the condition of minimizing VDM movement.

In some embodiments, each node 300 has a system VDM 322 that periodically, for example once per minute, collects statistics about the node 300 on which it is instantiated. In some embodiments, the system VDM 322 collects statistics for the node 300 as well as statistics per data VDM 324 instantiated on the node 300. For example, where the node 300 is implemented on a director board 302, the system VDM 322 may collect statistics relating to operation of the director board 302 including CPU 304 utilization levels, memory 306 access statistics, and other statistics available from guest operating system 308. These statistics from the director board 302 provide information as to the usage levels of the physical resources of the underlying hardware relative to the capacity of the physical resources.

The entire cluster has controller, referred to herein as the cluster manager 328, that collects information from each of the system VDMs 322 on each of the nodes 300 in the storage cluster 330, and also maintains the current layout of which data VDM 324 in the cluster is responsible for each user file system 326, and which node 300 is the backup node 300 for each VDM 324. Accordingly, the cluster manager 324 knows the node responsible for each VDM 324, which VDM 324 is handling each file system 326, and which node 300 is assigned as the backup node for each VDM 324.

In some embodiments, for each data VDM 324, the cluster manager 328 determines multiple aspects associated with overall storage cluster management and workload distribution within the storage cluster 330. In some embodiments, the cluster manager 328 examines the statistics for each node 300 in the storage cluster 330 to determine:
the total number of data VDMs 330 on the node 300;
the number of user file systems 326 on each data VDM 324;
the total number of user file systems 326 supported by the set of data VDMs 324 on the node;
activity levels of the file systems 326; and
operational statistics of the node 300.

In addition, when determining whether to move a VDM 324 from a current node 300 to a potential target node 300, the cluster manager 328 examines a similar set of statistics for the target node, including:
the number of total VDMs 324 on the potential target node;
the number of user file systems 326 on the potential target node;
the number of VDMs 324 for which the potential target node is currently assigned as the backup node, because if one or more of the VDMs 324 get failed over to the target node, the target node 300 must be able to continue to function and not be overloaded after the failover; and
operational statistics for the potential target node.

In some embodiments, the cluster manager 328 determines consumer statistics, such as the base operating system statistics of the node 300. One reason to incorporate this level of usage information, for example, is because other processes such as background processes may affect performance of the director board 302 implementing node 300. Example consumer statistics may include:
front end (FA) statistics to look for high write pending conditions;
events related to operation of the storage resources 146 and the underlying array of discs 160, such as an event indicating the storage resource pool is full; and
memory usage indications and other thresholds.

Certain statistics may be more important than other statistics. For example, a statistic indicating large 10 on a file system may be more important than a large number of VDMs present on a given node. Likewise, combinations of statistics may be used to ascertain high workload levels, such as a combination of several VDMs on a given node each of which has high 10 access statistics. Evaluating the number of VDMs in the context of the workload of the VDMs may provide a better indication of high work load on a node, than simply looking at the number of VDMs assigned to the node.

Accordingly, in some embodiments, the statistics collected by the cluster manager 328 are weighted and analyzed in context to determine an overall workload score for each of the nodes 300 of the storage cluster 330. The cluster manager 328 then attempts to distribute workload within the storage cluster 330 such that nodes 300 within the storage cluster 330 have similar workload scores.

In some embodiments, the cluster manager 328 identifies several sets of possible VDM movement combinations that enable VDMs to be more optimally distributed within the storage cluster 330 that will better balance the node score across the nodes of the storage cluster 330. In some embodiments, the cluster manager uses a set of hard rules and a set of soft rules in connection with identifying combinations that may be used to distribute the VDMs within the cluster. If an identified combination violates one of the hard rules it is discarded from the set of possible VDM movements and not implemented by the cluster manager 328. If an identified combination violates one or more of the soft rules, it remains a candidate combination and will be used if no other combination is suitable and it is the best combination. In some embodiments, a "best combination" is a combination that results in a better workload distribution within the storage cluster 330 than currently exists in the storage cluster 330, and exhibits the fewest number of soft rule violations.

In some embodiments the set of hard rules dictates whether it is possible to move a VDM within the cluster.

In some embodiments, the set of hard rules includes a first hard rule that a node's score must be above a high threshold value for it to be considered overloaded.

In some embodiments the set of hard rules further includes a second hard rule that a node's score must be below a low threshold value for it to be considered underloaded.

In some embodiments, the set of hard rules includes a third hard rule that a node 300 must have at least more than one data VDM 324 assigned to it for it to be considered overloaded, such that a node 300 with zero or one data VDM 324 will never be considered overloaded.

In some embodiments, the set of hard rules includes a fourth hard rule that a potential target node for a data VDM 324 that is to be moved must not have a score (including the new VDMs statistics) that exceeds the VDM's original node's score. That is, the cluster manager will take the potential target node for a VDM that the cluster manager would like to move, add the statistics of the VDM that is the candidate to be moved to the potential target node, and recalculate the weighted score for the potential target node. This enables the cluster manager to determine a hypothetical score for the potential target node if the VDM were to be moved. If the hypothetical score for the potential target node exceeds the score of the node that is currently hosting the VDM, moving the VDM to the potential target node will not help distribute workload more evenly within the storage cluster 330. Hence, the fourth hard rule prohibits moving a VDM to a potential target node where doing so would exacerbate workload inequality within the storage cluster 330.

In some embodiments, a set of soft rules is used to optimize overall performance of the storage cluster by attempting to minimize VDM movement within a storage cluster 330. VDM movement between nodes 300 of a storage cluster 330 requires the use of processor resources. For example, movement of a VDM from a first node 300 to a second node 300 within the storage cluster 330 may require a new emulation 312 to be started on a target node, and likewise may require a new system VDM 322 and data VDMs 324 to be started on the target node 300. In some embodiments, where the VDM is to be moved from a node on one storage system 120 to a node 300 on a different storage system 120, movement of the VDM 324 may also entail movement of data between storage systems 120. Hence, movement of a VDM 324 within a storage cluster 330 can be resource intensive. Accordingly, when possible, it is often preferable to minimize VDM movement within the storage cluster 330.

In some embodiments, the set of soft rules includes a first soft rule that attempts to assign VDMs to nodes in the cluster, at the original time of provisioning the storage cluster 330, that will minimize VDM movement within the storage cluster 330 after provisioning. When a new cluster is to be provisioned, spreading the VDMs evenly across the nodes with a roughly equal number of VDMs on each of the nodes of the storage cluster may minimize VDM movement, at least initially. Likewise, distributing responsibility for file systems between VDMs, optionally also considering anticipated file system usage, may initially optimize workload distribution within the storage cluster 330.

In some embodiments, the set of soft rules includes a second soft rule that seeks to minimize VDM movement by causing failover of a VDM from its current node to its backup node, rather than moving the VDM to a third node. During failover the backup node assumes responsibility for the VDM and node that previously had hosted the VDM becomes the backup node. Since the backup node has a replication of the file systems being handled by the VDM, failover of a VDM to its backup node can cause movement of workload within the cluster with a minimum of data movement. By using failover, accordingly, it is possible to move responsibility for the VDM, and hence the associated load on the file systems serviced by the VDM, from the original node to the backup node. Where the backup node is underloaded and the original node is overloaded, this second soft rule enables distribution of the load within the cluster while expending a minimal amount of resources.

In some embodiments, the set of soft rules includes a third soft rule that seeks to proactively initiate VDM movement in connection with other actions affecting the structure of the cluster. For example, node failure or node recovery within the cluster may be triggered to perform VDM movement within the cluster to seek to balance node scores within the cluster in connection with an event where additional capacity is being added to the cluster (node recovery) or in connection with an event that otherwise will require at least some of the VDMs in the cluster to be moved anyway (node failure).

Although a particular set of hard and soft rules was described, it is possible that additional and/or different hard and soft rules may be used depending on the particular embodiment.

Figure 5:
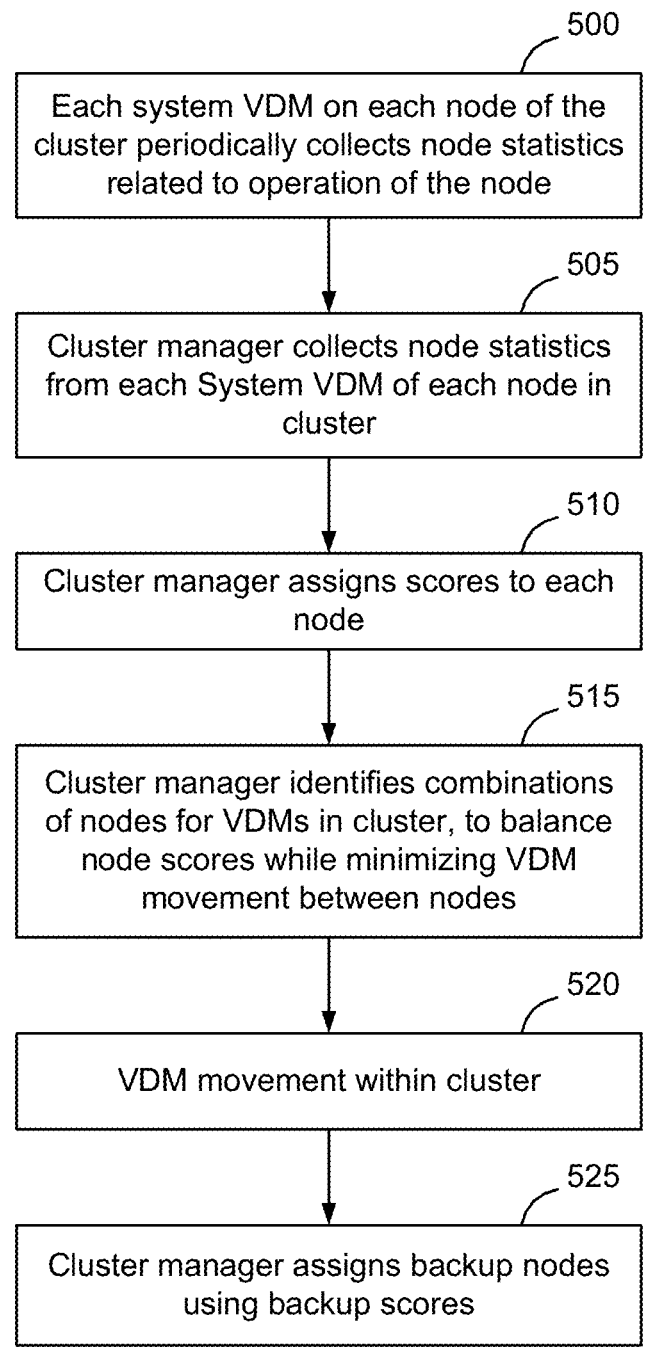
FIG. 5 is a flow chart of a process of load balancing virtual data movers between nodes of a storage cluster according to some embodiments of the present disclosure.

FIG. 5 shows an example process of performing load balancing of VDMs between nodes 300 of a storage cluster 330. As shown in FIG. 5, the system VDM 322 on each node 300 in the storage cluster 330 periodically collects node statistics from its node 300 (block 500). Example statistics collected by the system VDM 322 are discussed in greater detail above.

The cluster manager 328 collects node statistics from each of the system VDMs 322 of the storage cluster 330 (block 505). In some embodiments, node statistics are collected periodically by polling the system VDM processes 322 for node 300 statistics. In some embodiments the node statistics are collected by the cluster manager 328 on demand, for example in connection with initiation of a load balancing process.

After collecting node statistics, the cluster manager 328 weights the statistics and uses the weighted statistics to assign scores to each node (block 510). The cluster manager 328 then identifies combinations of nodes 300 for sets of VDMs in a cluster balancing process, to balance node 300 scores while minimizing VDM movement between nodes (block 515). In connection with some embodiments, consideration of node combinations for VDM placement uses the set of hard rules and the set of soft rules described above to determine whether one or more VDMs should be moved within the storage cluster 330. In some embodiments, the cluster manager 328 also determines whether the storage cluster 330 has too many nodes, for example if the node scores within the cluster are all too low. In some embodiments, the cluster manager also determines whether the storage cluster 330 has too few nodes, for example if the node scores within the storage cluster 330 are all too high.

Once a determined set of VDM movements has been finalized, the cluster manager 328 reconfigures the topology of the storage cluster 330 by moving VDMs between the nodes 300 of the storage cluster 330 (block 520). In connection with this, the cluster manager 328 will also commission new cluster nodes 300 and distribute VDMs to the new cluster nodes 300 where the cluster manager 328 has determined that the storage cluster 330 has too few nodes 300. Likewise, if the cluster manager 328 determines that the storage cluster 330 has too many nodes 300, the cluster manager 328 will decommission one or more of the cluster nodes 300 and redistribute the VDMs that were previously assigned to those nodes 300 to other nodes 300 of the storage cluster 330.

The cluster manager 328 is responsible for determining which node in the cluster will host particular VDMs and which nodes in the storage cluster 330 are backup nodes for the particular VDMs. In some embodiments, the step of identifying combinations of nodes for the set of VDMs (block 515) determines VDM placement for the VDMs and as well as the set of backup nodes. In other embodiments, the step of identifying combinations of nodes 300 for the set of VDMs (block 515) initially only determines which nodes will host the VDMs within the storage cluster 330. In embodiments where block 515 initially only determines VDM placement, backup node assignment is then implemented subsequently as shown in block 525. Backup node assignment may be determined after VDM movement within the cluster (after block 520 in FIG. 5) or may be determined before VDM movement (before block 520 in FIG. 5).

In some embodiments, backup node assignment within the storage cluster 330 is at least partially based on assuming that the VDM will failover to the backup node at some point in time, and looking at the node scores based on the hypothetical failover of the VDM within the primary/backup node pair. This enables backup node assignment to look at what would happen within the storage cluster 330 if one or more of the VDMs were to experience failover, and ensure that VDM failover will not cause a node score of the backup node to increase during failover to an unacceptable level.

Figure 6A:
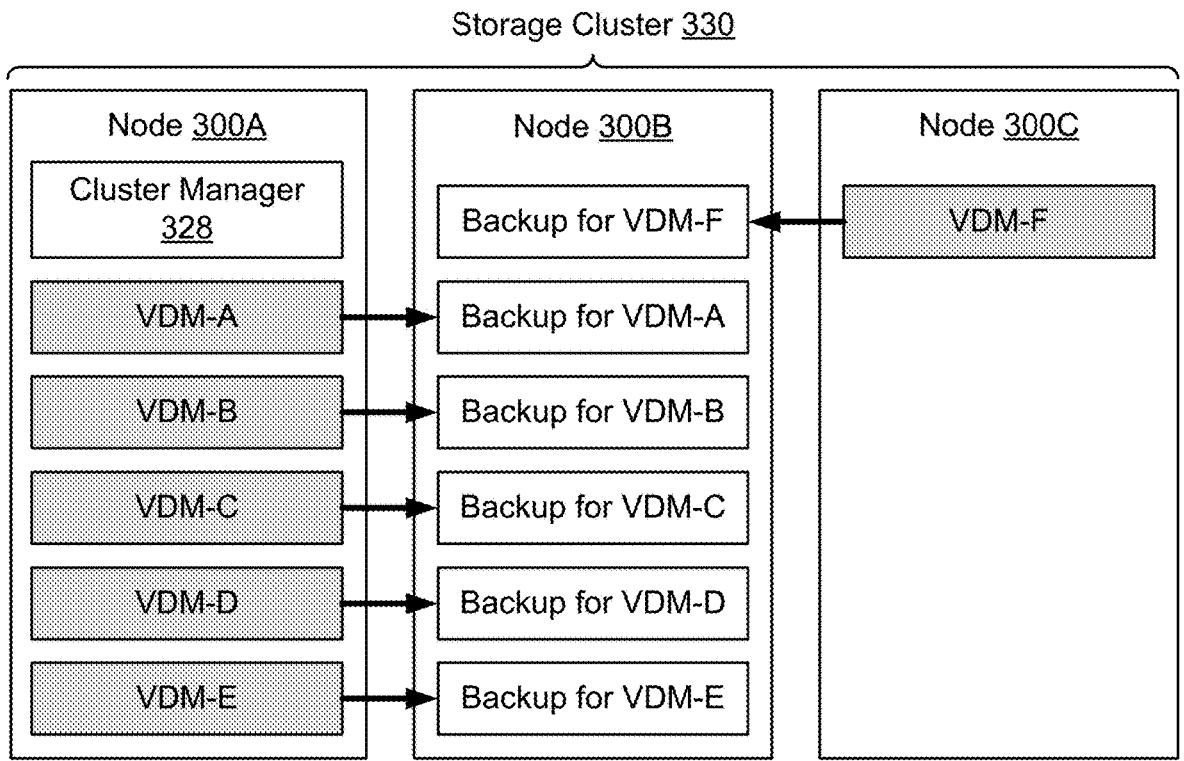
FIGS. 6A and 6B are functional block diagrams showing the process of load balancing a set of virtual data movers between nodes of a storage cluster according to some embodiments of the present disclosure.
Figure 6B:
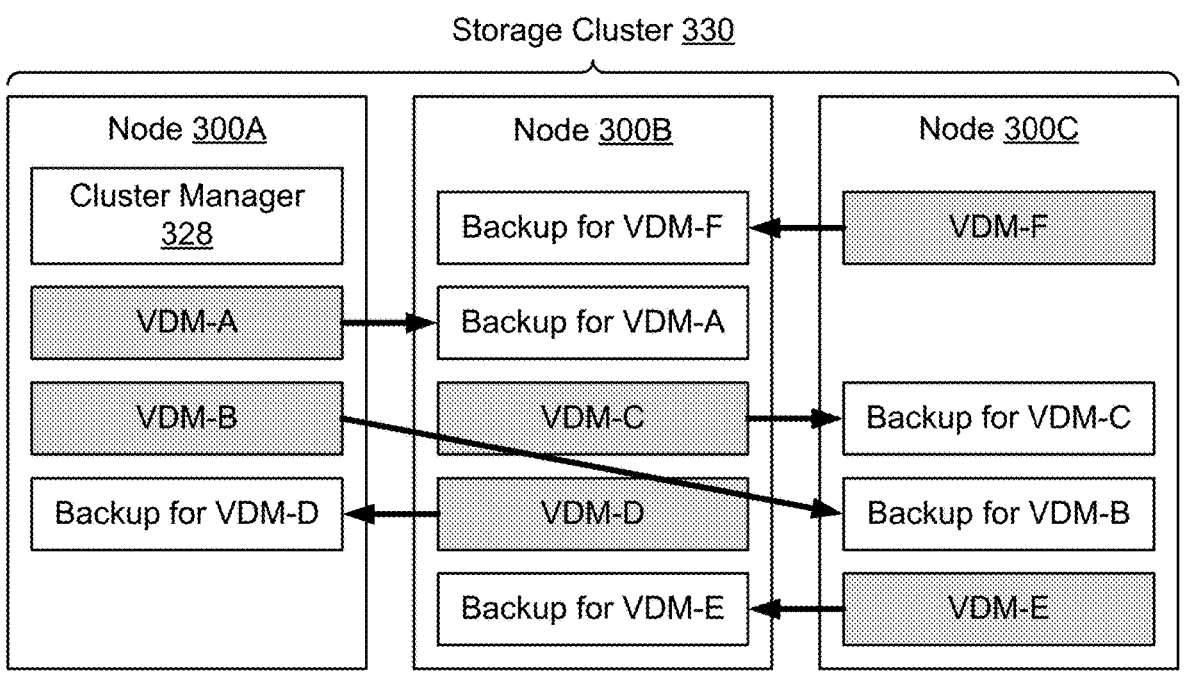

FIGS. 6A and 6B show an example distribution of VDMs within an example storage cluster 330. The example storage cluster shown in FIG. 6A includes a set of three nodes 300, designated as node 300A, node 300B, and node 300C. The set of nodes are responsible for a set of six VDMs referred to as VDMs 324A-F. Each VDM is assigned a backup node, where the node hosting the VDM is shaded and the backup node 300 has no shading. A black arrow indicates which node has been assigned as backup node for each VDM, to show where responsibility for the VDM will transfer in the event of failover. Node 300A has instantiated thereon a cluster manager 328 that controls organization of the storage cluster 330 and distribution of workload within the storage cluster. In some embodiments, cluster manger 328 implements the statistics collection and load balancing processes described herein.

At a first point in time, as shown in FIG. 6A, storage node 300A has been assigned to host five data VDMs (VDM 324A, VDM 324B, VDM 324C, VDM 324D, and VDM 324E). Storage node 300B has been assigned as the backup node for these five VDMs (VDM-A to VDM-E). Storage node 300C has been assigned to host one data VDM (VDM-F), and storage node 300B has been assigned as the backup node for VDM-F. In the hypothetical example, it will be assumed that the relative workload of each VDM is approximate, and accordingly the distribution shown in FIG. 6A represents a workload imbalance in which node 300A is overloaded, node 300C is underloaded, and node 300B has the potential to become overloaded if there is a significant number of VDM failovers within the storage cluster 330.

FIG. 6B shows an example workload distribution within a storage cluster 330 after a load balancing process has been performed by cluster manager 328. The following table (TABLE I) shows the changes that were made (VDM movements) relative to the original VDM and backup node assignments shown in FIG. 6A to achieve the distribution shown in FIG. 6B:

TABLE I

| Original VDM location and backup node assignment shown in FIG. 6A | Movement Action to achieve VDM location and backup node assignment shown in FIG. 6B |
| --- | --- |
| VDM 324-A<br>VDM location: Node 300A<br>backup node: Node 300B | No changes to VDM node assignment or backup node:<br>VDM location: Node 300A;<br>backup node: Node 300B |
| VDM 324-B<br>VDM location: Node 300A<br>backup node: Node 300B | Backup node assignment moved from node 300B to node 300C:<br>VDM location: Node 300A;<br>backup node: Node 300C |
| VDM 324-C<br>VDM location: Node 300A<br>backup node: Node 300B | Failover responsibility for VDM from node 300A to node 300B; re-assign backup to Node 300C.<br>VDM location: Node 300B;<br>backup node: Node 300C |
| VDM 324-D<br>VDM location: Node 300A<br>backup node: Node 300B | Failover responsibility for VDM from node 300A to node 300B<br>VDM location: Node 300B<br>backup node: Node 300A |
| VDM 324-E<br>VDM location: Node 300A<br>backup node: Node 300B | Move VDM from node 300A to node 300C. No change to backup node assignment.<br>VDM location: Node 300C<br>backup node: Node 300B |
| VDM 324-F<br>VDM location: Node 300C<br>backup node: Node 300B | No changes to VDM node assignment or backup node:<br>VDM location: Node 300C<br>backup node: Node 300B |

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of load balancing virtual data movers (VDM) between nodes of a storage cluster, the computer program including a set of instructions which, when executed by a computer, cause the computer to perform a method comprising the steps of:
 establishing a storage cluster including a plurality of nodes, one of the nodes implementing a cluster manager and each node having a system Virtual Data Mover (VDM) instantiated thereon;
 assigning, by the cluster manager, primary responsibility for each of a plurality of data VDMs to corresponding nodes of the storage cluster, each data VDM having responsibility for at least one user file system;
 assigning, by the cluster manager, corresponding backup nodes for the plurality of data VDMs;
 collecting node statistics by each system VDM on each node in the cluster of nodes, the node statistics including operational parameters of the node and activity levels of the data VDMs on the node;
 collecting the node statistics, by a cluster manager, from each of the system VDMs;
 using the collected node statistics to assign a respective node score to each node in the storage cluster;
 using the node scores to identify possible data VDM movement combinations within the storage cluster;
 selecting one of the data VDM movement combinations for implementation within the storage cluster that will reduce disparity between node scores within the storage cluster; and
 implementing the selected one of the data VDM movement combinations by moving at least some of the data VDMs between the nodes of the storage cluster.

2. The non-transitory tangible computer readable storage medium of claim 1, further comprising weighting the node statistics in connection with using the collected node statistics to assign the respective node scores.

3. The non-transitory tangible computer readable storage medium of claim 2, wherein the step of selecting one of the data VDM movement combinations for implementation comprises applying a first set of hard rules and a second set of soft rules.

4. The non-transitory tangible computer readable storage medium of claim 3, wherein a first hard rule of the set of hard rules is that a given node's score must be above a high threshold for the that given node to be considered overloaded.

5. The non-transitory tangible computer readable storage medium of claim 3, wherein a second hard rule of the set of hard rules is that a given node's score must be below a low threshold for that given node to be considered underloaded.

6. The non-transitory tangible computer readable storage medium of claim 3, wherein a third hard rule of the set of hard rules is that a given node must have at least more than one data VDM assigned to it for the given node to be considered overloaded.

7. The non-transitory tangible computer readable storage medium of claim 3, wherein a fourth hard rule of the set of hard rules is that a potential target node to receive a given data VDM in a data VDM movement process must not have a target node score that exceeds a node score of the node that is currently hosting the given data VDM.

8. The non-transitory tangible computer readable storage medium of claim 7, wherein the target node score is a hypothetical node score for the target node based on the target node's current node score and an expected increase in node score attributable to movement of the given data VDM to the target node.

9. The non-transitory tangible computer readable storage medium of claim 3, wherein the set of soft rules minimizes data VDM movement within a storage cluster.

10. The non-transitory tangible computer readable storage medium of claim 9, wherein a first soft rule of the set of soft rules is that the data VDMs are assigned to nodes within the storage cluster, at an original time of provisioning the storage cluster to minimize subsequent movement of the data VDMs within the storage cluster after provisioning.

11. The non-transitory tangible computer readable storage medium of claim 9, wherein a second soft rule of the set of soft rules is that data VDM movement of the data VDMs should be minimized by causing a given failover from the node hosting the given data VDM to the assigned corresponding backup node for the given data VDM rather than moving the given data VDM to a third node in the storage cluster.

12. The non-transitory tangible computer readable storage medium of claim 9, wherein a third soft rule of the set of soft rules is that data VDM movement is proactively initiated in connection with other actions affecting a structure of the storage cluster.

13. The non-transitory tangible computer readable storage medium of claim 12, wherein one of the other actions is addition of a new node to the storage cluster.

14. The non-transitory tangible computer readable storage medium of claim 12, wherein one of the other actions is removal of one of the nodes from the storage cluster.

15. The non-transitory tangible computer readable storage medium of claim 1, wherein the operational parameters of the node include:
 a total number of data VDMs on the node; and
 a number of user file systems on each data VDM on the node.

16. The non-transitory tangible computer readable storage medium of claim 1, wherein the operational parameters of the node include:
 front end statistics associated with high write pending conditions;
 storage array events; and
 memory usage levels.

17. The non-transitory tangible computer readable storage medium of claim 1, wherein the activity levels of the data VDMs on the node include input/output activity levels of each file system on each data VDM on the node.

* * * * *